United States Patent [19]
Tas

[11] Patent Number: 5,306,877
[45] Date of Patent: Apr. 26, 1994

[54] APPARATUS FOR SORTING SPHERICAL PRODUCTS ACCORDING TO WEIGHT

[76] Inventor: Adrianus W. Tas, Burgemeester Winkellaan 3, 2631 HG Nootdorp, Netherlands

[21] Appl. No.: 965,446

[22] Filed: Oct. 23, 1992

[30] Foreign Application Priority Data

Oct. 30, 1991 [NL] Netherlands ............... 9101821

[51] Int. Cl.⁵ ........................................... G01G 19/00
[52] U.S. Cl. ................... 177/145; 198/365; 209/593; 209/912
[58] Field of Search ............ 209/592, 593, 645, 698, 209/912; 177/50, 145; 198/365

[56] References Cited

U.S. PATENT DOCUMENTS

| | | | |
|---|---|---|---|
| 4,426,006 | 1/1984 | Harii et al. | 209/593 |
| 4,583,636 | 4/1986 | Tas | 209/592 X |
| 4,770,260 | 9/1988 | Brook | 177/145 |
| 4,817,744 | 4/1989 | Power, Jr. | 209/592 X |
| 5,020,675 | 6/1991 | Cowlin et al. | 209/592 X |
| 5,037,351 | 8/1991 | Van Den Nieuwelaar et al. | 209/592 X |

FOREIGN PATENT DOCUMENTS

| | | |
|---|---|---|
| 0273313 | 7/1988 | European Pat. Off. |
| 0283388 | 9/1988 | European Pat. Off. |
| 0843609 | 7/1952 | Fed. Rep. of Germany ...... 209/645 |

Primary Examiner—D. Glenn Dayoan
Assistant Examiner—Tuan N. Nguyen
Attorney, Agent, or Firm—Griffin Butler Whisenhunt & Kurtossy

[57] ABSTRACT

An apparatus for sorting spherical products, comprising an endless conveyor equipped with bearing rollers (2), with a product lifting element (10) arranged between each pair of successive bearing rollers (2), this product lifting element (10) being capable of assuming a first, lowermost position wherein the product (16) is clear of the lifting element (10) and rests on the bearing rollers (2), while in a second, higher position the product (16) is clear of the bearing rollers (2) and rests on the lifting element (10) to be subjected to another operation, for instance a weighing step or another physical evaluation.

7 Claims, 2 Drawing Sheets

1

APPARATUS FOR SORTING SPHERICAL PRODUCTS ACCORDING TO WEIGHT

This invention relates to an apparatus for sorting spherical products, comprising an endless conveyor capable of being driven by at least one chain for conveying the products to be sorted in individually supported manner, while along the path of movement of the conveyor a weighing means is present for weighing each individual product.

Such an apparatus is known from U.S. Pat. No. 4,583,636. The endless conveyor of this known apparatus consists of two parallel chains interconnected by pins, provided at a fixed pitch distance, extending transversely to the direction of conveyance. Pivotally mounted on each of these pins is a U-shaped support bracket and in this bracket a product receiving member is likewise pivotally supported.

Although this known apparatus functions excellently in practice and yields accurate weighing results, it still exhibits some disadvantages susceptible to improvement, such as:

Owing to the presence of a supporting bracket with product receiving member between each pair of successive transverse pins, the pitch distance between those transverse pins is considerably greater than the diameter of the product to be sorted. A reduction of this pitch distance would yield an increase of the processing capacity of the apparatus.

The combination supporting bracket/product receiving member is a rather complicated construction, which, moreover, has a relatively great deadweight compared with the product to be weighed. A reduction of this deadweight could yield increased accuracy.

The products to be sorted must in some manner or other be individualized and placed in a product receiving member and discharged therefrom after weighing. It has been found to be troublesome to fill the product receiving members directly from a supply device supplying the products in bulk.

The object of the invention is to provide an apparatus of the above-described type wherein these drawbacks have been obviated. To that end, the apparatus according to the invention is characterized in that the conveyor is a roller conveyor comprising bearing rollers, with a product lifting element arranged between each pair of successive bearing rollers, this product lifting element being normally in a first, lowermost position wherein the product is clear of the lifting element and rests on two adjacent bearing rollers, while the lifting element can further be brought into at least a second, higher position wherein the product is clear of the bearing rollers and rests on the lifting element, in which second position the weighing of the product can take place.

In this manner, a separation of functions has been obtained. During conveyance, the products to be sorted are supported by the bearing rollers, which can be arranged at a pitch distance that is related to the average diameter of the product to be sorted and therefore is smaller than the pitch distance of the transverse pins in the known apparatus. During weighing, the products are lifted off the bearing rollers by means of the product lifting element, which has a smaller deadweight than the known combination supporting bracket/product receiving member, so that the weighing accuracy increases. Filling the conveyor equipped with bearing rollers is simpler than filling the conveyor equipped with product receiving members.

Preferably, each bearing roller is connected to the drive chain of the roller conveyor by means of a roller carrying element while each lifting element is mounted on a corresponding roller carrying element by means of a rod parallelogram. Thus, one drive chain for the conveyor will suffice, while at the same time a possibility of properly mounting the lifting element is obtained.

The product lifting element can assume various positions, for instance a conveyance position, a weighing position and a discharge position. To that end, each lifting element comprises at the lower end thereof a guide roller capable of cooperating with a guideway which slopes upwards upstream of the weighing means and extends horizontally at the location of the weighing means.

For supporting the product for instance in the weighing position or the discharge position, each lifting element comprises at the top thereof carrying forks, which, in the first, lowermost position of the lifting element, can be received in annular recesses of the adjacent bearing rollers. For discharging a product in lateral direction, the carrying forks are pivotable about a shaft of the lifting element in a direction transverse to the direction of movement of the roller conveyor.

To enable centred support of the product in a direction transverse to the direction of conveyance as well, the bearing rollers have a substantially hyperboloid shape and a bearing surface of concave configuration, while on opposite sides of the central part, transition parts are arranged whose diameter is smaller than that of the central part.

One embodiment of the apparatus according to the invention will now be further explained with reference to the accompanying drawings, in which.

Figure 3:
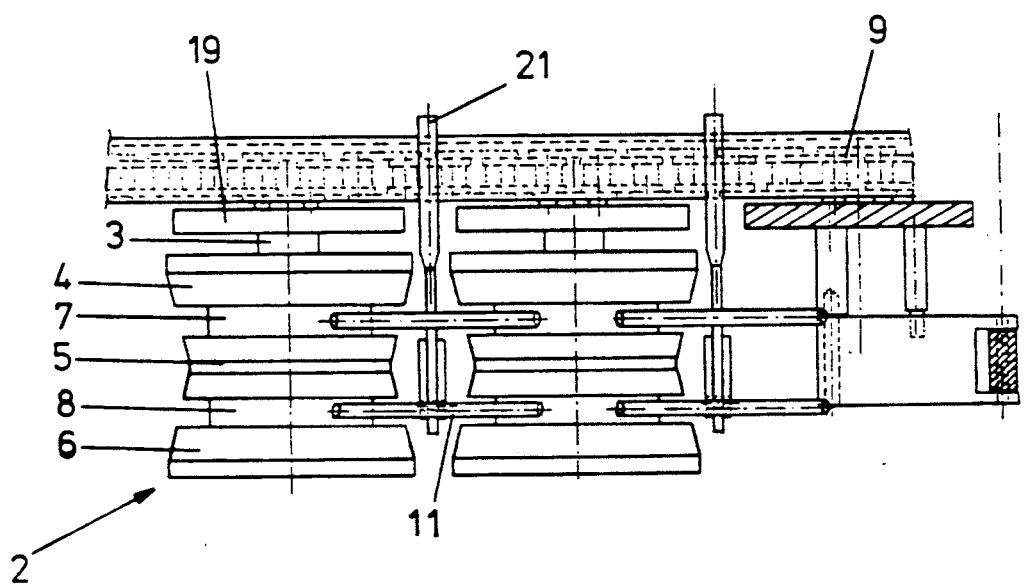
FIG. 3 is a top plan view of the apparatus shown in FIGS. 1 and 2, with omission of the apples.

The apparatus according to the invention comprises a roller conveyor 1 equipped with bearing rollers 2. The bearing rollers 2 are each mounted for free rotation on a shaft 3 (see FIG. 3), which is mounted on a carrying element 19 which in turn is connected to a drive chain 9. The chain 9 is confined in a guide rail 25.

Disposed between each pair of adjacent rollers is a product lifting element 10 which comprises, at the upper end thereof, carrying forks 11 and, at the lower end thereof, a guiding roller 12 capable of cooperating with a guideway 13. Each product lifting element 10 is connected to the corresponding carrying element 19 by means of a rod parallelogram 17. The arm 18 of the rod parallelogram that is connected to the carrying element 19 extends parallel to the lifting element 10, so that this lifting element 10 can be displaced parallel to itself in vertical direction.

Figure 1:
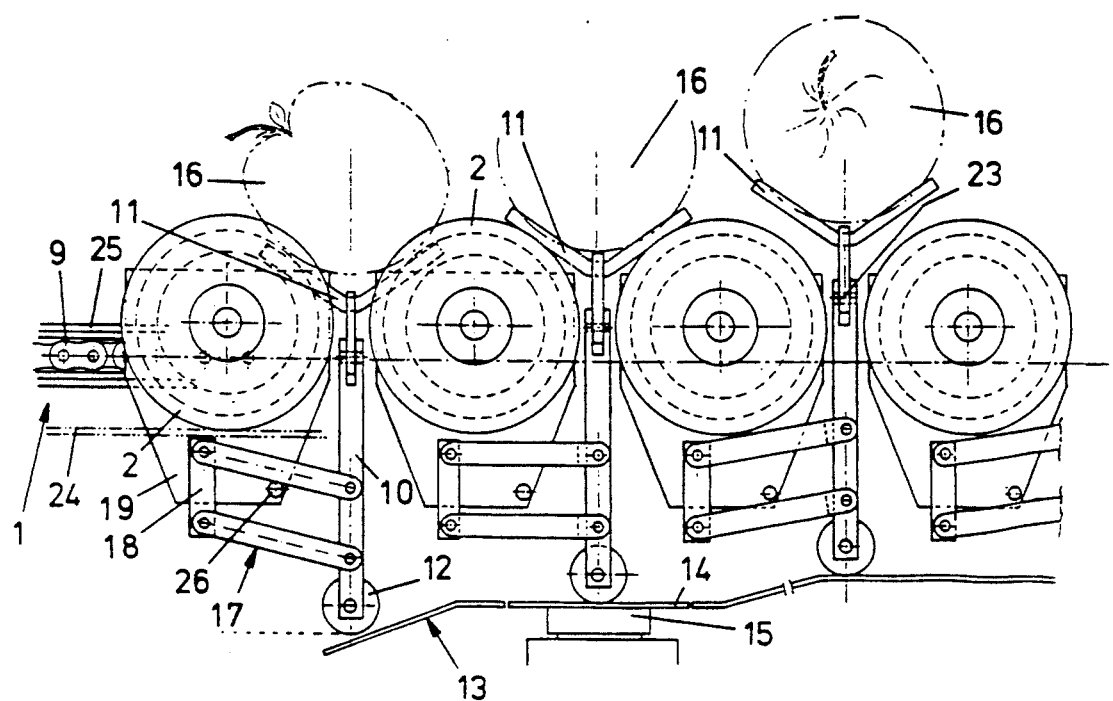
FIG. 1 is a schematic side elevation of a part of the apparatus for sorting apples according to weight, at the location of the weighing and discharge station.

FIG. 1 shows three lifting elements 10, each in a different vertical position. The left-hand lifting element 10 is in the conveyance position wherein the product 16 rests on the bearing rollers 2 while the carrying forks 11 of the lifting element are located below the bearing surface of the bearing rollers 2. In this position, the rod parallelogram 17 rests on a stop 26 mounted on the carrying element 19. The central lifting element 10 is disposed in the weighing position above the weighing station 15. In this weighing position, the carrying forks 11 reach above the bearing surface of the bearing rollers 2. The lifting element 10 is brought from the conveyance position into the weighing position by means of the guideway 13, which slopes upward upstream of the weighing station 15 and extends horizontally at the location of the weighing station 15. The guideway portion 14 above the weighing station of course forms a separate part of the guideway 13. It is preferred that in the weighing position of the lifting element 10 the laterally extending rods of the rod parallelogram 17 extend horizontally so as to increase weighing accuracy.

The right-hand lifting element 10 is shown in the discharge position wherein the lifting element 10 has been displaced by means of the guideway 13 so as to extend above the weighing position. The product 16 is discharged transversely to the direction of conveyance. To that end, the carrying forks 11 are pivotally mounted on a shaft 23 (see FIG. 2). The carrying forks are pivoted with the aid of a lever 21, which, by means of an ejection element (not shown), can be brought from the position indicated by solid lines into the discharge position indicated by broken lines, wherein a product 16 can be discharged over the lateral edge of the bearing rollers 2 and delivered via a chute 22 to a discharge conveyor for the desired product sorting class.

To provide for centred support of the product in a direction transverse to the direction of conveyance as well, the bearing rollers 2 have a hyperboloid shape and a concave bearing surface. To that end, each bearing roller 2 may be composed of three discs 4, 5, 6, of which the outer discs 4, 6 have a greater diameter than the central disc 5. Arranged on opposite sides of the central disc 5 are spacer rings 7, 8 whose diameter is smaller than that of the central disc 5. The spacer rings 7, 8 form interruptions in the product bearing surface of a bearing roller 2, which interruptions are capable of accommodating the carrying forks 11 of a lifting element 10 that is in the conveyance position. The bearing roller 2 may also be designed as a one-piece part having a stepped diameter corresponding to the diameters of the above-described discs 4, 5, 6 and spacer rings 7, 8.

Figure 2:
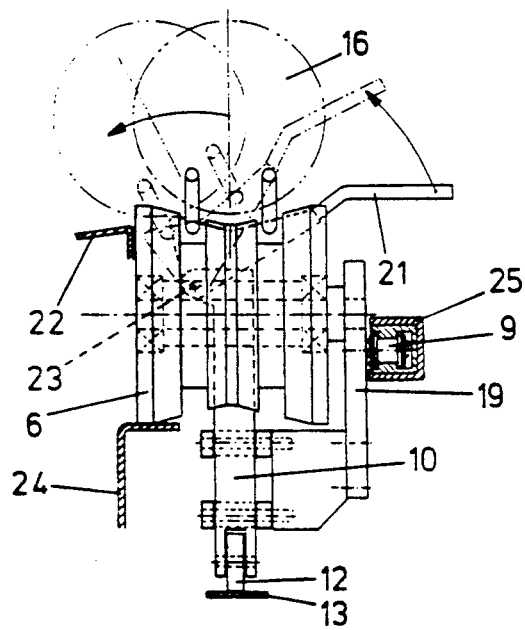
FIG. 2 is a cross-section of the apparatus according to FIG. 1.

The outer discs 4, 6 have a smooth circumferential surface, with the disc 6 being supported and capable of being driven by a supporting rail 24 (FIG. 2). The central disc 5 has a circumferential surface that has a considerably higher coefficient of friction than the circumferential surface of the outer discs 4, 6. The drive of the bearing rollers 2 via the supporting rail 24 gives the conveyor 1 self-loading properties, i.e., the conveyor 1 can have an upwardly sloping portion thereof arranged in a product reservoir containing a stock of products to be sorted, so that the conveyor is quickly and efficiently filled with individualized products that are correctly centred and oriented. The higher coefficient of friction of the circumferential surface of the central disc 5, which surface is in contact with the largest diameter of the product, provides for calm product behaviour in the position where it is supported by the bearing rollers 2, thereby preventing the product from spinning about an axis perpendicular to the surface of conveyance in that slip occurs at the location of the outer discs 4, 6, which have a greater diameter and engage the product at a smaller diameter.

What I claim is:

1. In an apparatus for conveying and weighing spherical products in preparation for sorting the products by weight, and having an endless conveyor driveable by at least one drive chain for conveying the products in an individually supported manner, and a weighing means in a path of movement of the conveyor for weighing each individual product, the improvement comprising a roller conveyor having bearing rollers connected to the drive chain by means of a roller carrying element and a product lifting element arranged between each pair of successive bearing rollers and mounted on a corresponding roller carrying element by means of a rod parallelogram, said product lifting element being moveable from a first, lowermost position wherein the product is clear of the lifting element and rests on two adjacent bearing rollers to at least a second, higher position wherein the product is clear of the bearing rollers and rests on the lifting element, such that when the lifting element is in said second position the product is weighable by said weighing means.

2. An apparatus according to claim 1, wherein each lifting element has at a lower end thereof a guide roller for cooperating with a guideway which slopes upwardly upstream of the weighing means and extends horizontally at a location of the weighing means.

3. An apparatus according to claim 1, wherein each lifting element has at an upper end thereof carrying forks for supporting the products in the second position, which carrying forks are receivable in annular recesses of adjacent bearing rollers when the lifting element is in the first, lowermost position.

4. An apparatus according to claim 3, wherein each carrying fork is pivotable about a shaft of the lifting element in a direction transverse to the direction of movement of the roller conveyor, for discharging a product in a lateral direction.

5. An apparatus according to claim 1, wherein each bearing roller has a substantially hyperboloid shape, with a diameter of a central part being smaller than a diameter of end parts of the bearing roller and between the central part and the end parts are disposed transition parts, a diameter of which is smaller than that of the central part.

6. An apparatus according to claim 5, wherein each bearing roller is composed of a series of bearing discs rotatably mounted on a shaft and on opposite sides of a central disc are disposed spacer means.

7. An apparatus according to claim 6, wherein the bearing rollers are rotatable by means of a supporting rail for an outer disc of each bearing roller and wherein a circumference of the central disc has a higher coefficient of friction than that of two outer discs.

* * * * *